United States Patent
Parekh et al.

(10) Patent No.: US 9,647,946 B2
(45) Date of Patent: May 9, 2017

(54) CONTROLLING DATA ACCESS AND RATE IN A NETWORK

(71) Applicant: AT&T Intellectual Property I, L.P., Atlanta, GA (US)

(72) Inventors: Shyam Parekh, Orinda, CA (US); Catagay Buyukkoc, Holmdel, NJ (US); Yonatan Aharon Levy, Manalapan, NJ (US); Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 564 days.

(21) Appl. No.: 13/686,355

(22) Filed: Nov. 27, 2012

(65) Prior Publication Data
US 2014/0149262 A1    May 29, 2014

(51) Int. Cl.
*H04W 28/02* (2009.01)
*H04L 12/819* (2013.01)
*H04L 12/26* (2006.01)
*G06Q 30/06* (2012.01)

(52) U.S. Cl.
CPC .......... *H04L 47/21* (2013.01); *H04L 43/0882* (2013.01); *G06Q 30/0641* (2013.01)

(58) Field of Classification Search
None
See application file for complete search history.

(56) References Cited

U.S. PATENT DOCUMENTS

| 5,311,513 | A | 5/1994 | Ahmadi et al. |
| 5,524,006 | A | 6/1996 | Hluckyj et al. |
| 7,088,678 | B1 | 8/2006 | Freed et al. |
| 7,773,503 | B2 | 8/2010 | Zhao et al. |
| 2002/0046264 | A1* | 4/2002 | Dillon ............ H04B 7/18584 709/219 |
| 2003/0083041 | A1* | 5/2003 | Kumar et al. ............ 455/406 |
| 2011/0235792 | A1* | 9/2011 | Foster et al. ............ 379/114.2 |

(Continued)

OTHER PUBLICATIONS

Ciucu F., et al., "The Partially Stopped Leaky Bucket: An Efficient Traffic Regulator with Constant Time Implementation," (2008).

(Continued)

*Primary Examiner* — John Hayes
*Assistant Examiner* — Jason Fenstermacher
(74) *Attorney, Agent, or Firm* — Hartman & Citrin LLC

(57) ABSTRACT

Concepts and technologies are disclosed herein for controlling data access and rate in a network. An enforcement application can detect a request for a data session and determine how and when the requested data session is to be established. The enforcement application can consider various data, input obtained at the user device, and/or other considerations including subscriber data and network data. Based upon these data, the enforcement application can determine network congestion, available resources, available bandwidth, an allocation rate of congestion credits ("credits") for the user, a flow rate of the credits from an account to a credit pool, and a usage rate of the credits from the credit pool. The enforcement application can be configured to enforce the usage rate against a data session and to issue one or more commands to control the data session.

16 Claims, 9 Drawing Sheets

(56) References Cited

U.S. PATENT DOCUMENTS

2011/0275344 A1* 11/2011 Momtahan et al. .......... 455/405
2012/0092995 A1* 4/2012 Arvidsson et al. ........... 370/235
2012/0120798 A1* 5/2012 Jacquet et al. ............... 370/230

OTHER PUBLICATIONS

Walrand, J, "How Much for What? Thoughts on Economic Issues in Networks," GlobeCom2006, Nov. 2006.
Pinaikul, S., et al., "Credit token leaky bucket algorithm with fuzzy logic in ATM networks." Networks, 2001. Proceedings. Ninth IEEE International Conference on. IEEE, 2001.
"The Token Bucket(Leaky Bucket) Model," <http://qbone.internet2.edu/bb/Bucket.doc> (Aug. 13, 2012; dated Jun. 29, 2000).

* cited by examiner

CONTROLLING DATA ACCESS AND RATE IN A NETWORK

BACKGROUND

This application relates generally to network control. More specifically, the disclosure provided herein relates to controlling data access and rate in a network.

In some modern communication networks such as some cellular networks, data communications have become even more prevalent than voice communications. As such, some communication network operators have recently shifted network growth efforts from increasing capacity for voice communications to efforts for growing data communications portions of the communication networks in an effort to provide customers with quick and reliable data communications. Notwithstanding network operators' efforts to increase the capacity of data portions of these communications networks, congestion continues to be a problem for many network operators.

Some communications networks may process millions or even billions of requests for data communications per day. The requests for data communications can effectively ask the network to establish a data session between the requestor and some source of data such as a media server, an email server, or the like. The network may or may not inspect the requests to determine priority and/or importance of the requests. Rather, the network may simply establish the requested session on a first-come-first-served basis.

While network traffic is relatively predictable, current events or other trends may cause temporary or even prolonged spikes in data traffic. These spikes may be difficult to predict. Additionally, because data resources of the network typically are finite, there may be no way to quickly adjust network operations to accommodate such a spike in data traffic. Furthermore, users sometimes pay for and expect reliable and fast data communications. These users expect their data sessions to begin almost immediately. Because the users may not be aware of network congestion at any given time, these users expect data delivery to be consistent and any delay or performance degradation can affect a user's perception of the network provider. Thus, network congestion can not only affect performance of the network, but also can affect user satisfaction with the network in general.

SUMMARY

The present disclosure is directed to controlling data access and rate in a network. An application or service such as an application executing at a user device can request data from a data source by way of a request. The user device can transmit the request to the data source. An enforcement application executing at a server computer can be configured to detect the request and/or to be called or accessed by the data source to determine how and when the data source is to respond to the request. The enforcement application can be configured to use congestion credits ("credits") to control the requested data session based upon various data, input obtained at the user device, and/or other considerations.

In particular, the enforcement application can be configured to obtain subscriber data and network data. Based upon these data, the enforcement application can determine network congestion, available resources, available bandwidth, a credit allocation rate ("allocation rate") of credits for the user, a credit flow rate ("flow rate") of the credits from an account to a credit pool, and a credit usage rate ("usage rate") of the credits from the credit pool. In some embodiments, charging and billing systems can be configured to communicate with the user device to determine the usage rate, and the charging and billing systems can provide that information to the enforcement application as part of the subscriber data. In some embodiments, the charging and billing systems can generate one or more usage rate options and transmit the options to the user device as or within options data that can be presented at the user device. A selection or decision relating to the options can be represented in traffic management data generated at the user device and transmitted to the charging and billing systems.

The enforcement application can be configured to enforce the usage rate against a data session. The enforcement application also can be configured to issue one or more commands to the data source to control the data session. For example, the enforcement application can monitor the credit pool and apply the usage rate to the credit pool. If the credit pool runs out of credits, the enforcement application can issue commands to terminate the data session, to order a query to the user device to determine if a user wants to buy more credits, to change a guaranteed or applied QoS and/or other quality aspect of the data session, and/or to take other actions. As such, the enforcement application can use credits to control data access in networks. The functionality of the enforcement application described herein also can be used to reward "good" behavior on a network such as not using congested resources.

According to one aspect of the concepts and technologies disclosed herein, a device is disclosed. The device can include a processor and a memory storing computer-executable instructions. When the computer-executable instructions are executed by the processor, the processor can detect a data session request, prompt, at the device, for a traffic control decision specifying a credit usage rate, obtain the traffic control decision at the device, generate traffic management data including an indication of the traffic control decision, and provide the traffic management data to a network device.

According to some embodiments, the device can be configured to obtain options data from a charging and billing system, the options data specifying an option including the credit usage rate, present the options data in a user interface, and detect a selection of the option via the user interface. The user interface can include a UI control for presenting an option including the credit usage rate, and a further UI control for presenting a further option including a further credit usage rate. The device also can be configured to present a user interface for viewing options associated with a credit account used to control network access. The user interface can include a field for presenting a credit balance in the credit account, a further field for presenting accredit subscription plan associated with the credit account, the credit subscription plan including a credit allocation rate, a UI control for purchasing credits, and a further UI control for modifying the credit subscription plan.

According to another aspect of the concepts and technologies disclosed herein, a method is disclosed. The method can include detecting a data session request, the data session request including a request for a data session between a data source and a user device, obtaining, at a server computer executing an enforcement application, network data indicating a network condition, determining, based at least partially upon the network data, a credit usage rate, and applying the credit usage rate during a data session.

In some embodiments, the method can include obtaining subscriber data and determining, based at least partially upon the subscriber data, the credit usage rate. The subscriber data can include subscriber information and a credit subscription plan. In some embodiments, the subscriber data can include the credit usage rate, wherein the credit usage rate can be obtained from the user device. In some embodiments, determining the credit usage rate can include generating a data session credit usage rate option, transmitting the data session credit usage rate option to the user device, and obtaining a selection of the data session credit usage rate from the user device.

In some embodiments, applying the credit usage rate further can include determining a time associated with the credit usage rate, initiating a timer set to the time, and determining if the time has passed. In response to a determination that the time has passed, the method can include removing a credit from a credit pool associated with the user device. The method also can include determining if additional credits are available in an account associated with the user device, and in response to a determination that additional credits are not available, issuing a command to terminate the data session. In some embodiments, the method can also include determining if additional credits are available in an account associated with the user device, and in response to a determination that additional credits are not available, issuing a command to generate a prompt at the user device to purchase additional credits. Applying the credit usage rate further can include allocating credits to a credit account associated with the user device at an allocation rate, adding credits from the credit account to a credit pool at a flow rate, and removing credits from the credit pool at the credit usage rate.

According to yet another aspect, a computer storage medium is disclosed. The computer storage medium can have computer-executable instructions stored thereon that, when executed by a processor, cause the processor to perform operations including detecting a request for a data session between a data source and a user device, obtaining network data indicating a network condition, determining, based at least partially upon the network data, a credit usage rate, and applying the credit usage rate during a data session.

In some embodiments, the operations can further include obtaining subscriber data including subscriber information and a credit subscription plan, and determining, based at least partially upon the subscriber data, the credit usage rate. In some embodiments, the subscriber data can include the credit usage rate. The credit usage rate can be obtained from the user device. In some embodiments, determining the credit usage rate can include generating a data session credit usage rate option, issuing a command to transmit the data session credit usage rate option to the user device, and obtaining a selection of the data session credit usage rate from the user device.

In some embodiments, the operations can also include determining a time associated with the credit usage rate, initiating a timer set to the time, determining if the time has passed, and in response to a determination that the time has passed, removing a credit from a credit pool associated with the user device. The operations also can include determining if additional credits are available in an account, and in response to a determination that additional credits are not available in the account, issuing a command to terminate the data session. Applying the credit usage rate during the data session can include allocating credits to a credit account associated with the user device at an allocation rate, adding credits from the credit account to a credit pool at a flow rate, and removing credits from the credit pool at the credit usage rate. In some embodiments, the operations also can include determining a time associated with the credit usage rate, initiating a timer set to the time, determining if the time has passed, and in response to a determination that the time has passed, removing a credit from the credit pool associated with the user device.

The credit usage rate also can be defined, in some embodiments, as a number of bytes transferred. Thus, a number of transferred bytes may cost one credit, or the like. Thus, some embodiments of the concepts and technologies disclosed herein can determine a number of bytes associated with the credit usage rate, initiate a counter to count bytes transferred, determine if the number of bytes have been transferred, and in response to a determination that the number of bytes have been transferred, removing a credit from the credit pool associated with the user device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
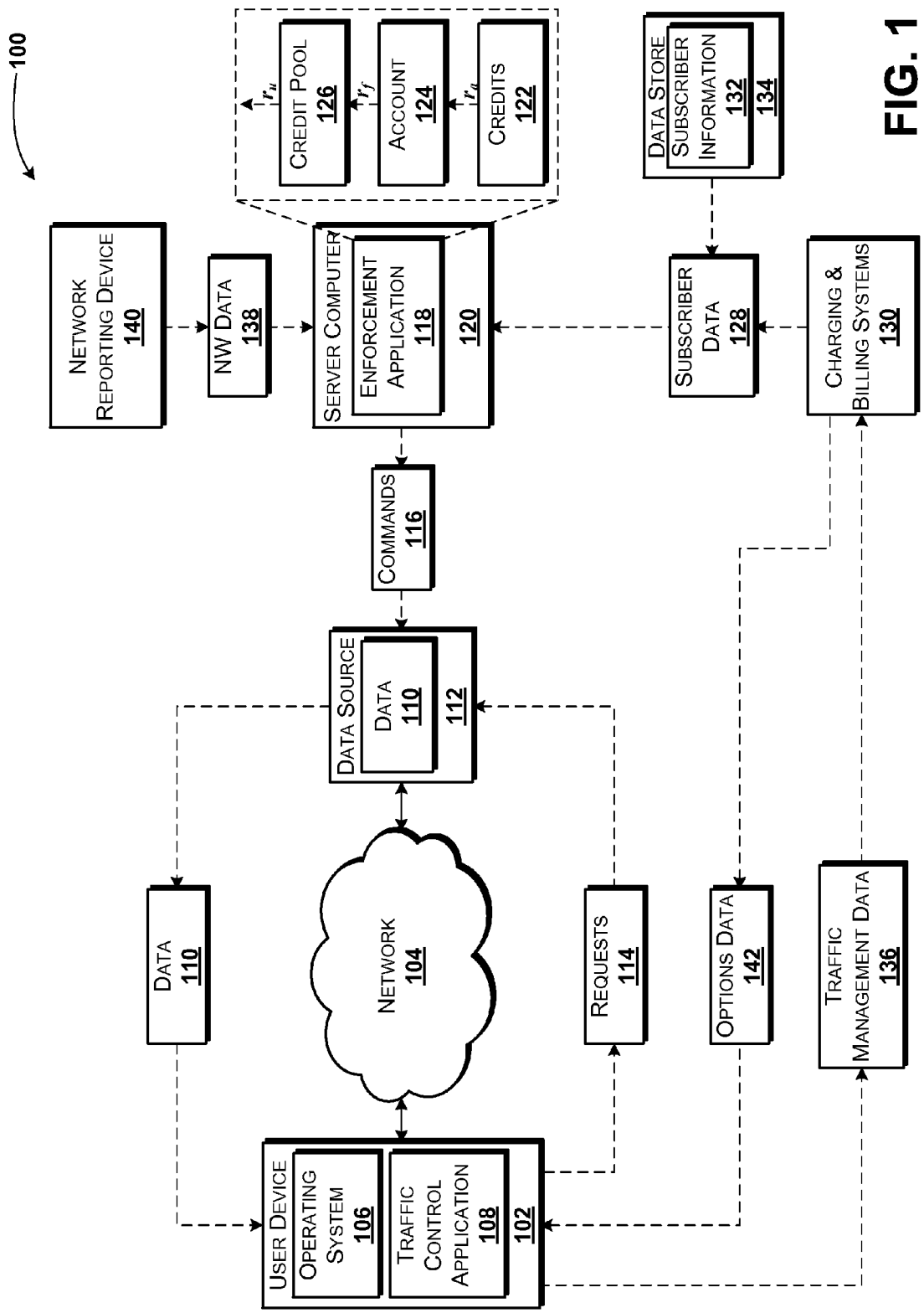
FIG. 1 is a system diagram illustrating an illustrative operating environment for the various embodiments disclosed herein.

The following detailed description is directed to controlling data access and rate in a network. According to various embodiments of the concepts and technologies disclosed herein, a user device can request data from a data source by way of a request. The user device can transmit the request to the data source. An enforcement application executing at a server computer can be configured to detect the request and/or to be called or accessed by the data source to determine how and when the data source is to respond to the request. The enforcement application can be configured to use credits to control the requested data session based upon various data, input obtained at the user device, and/or other considerations.

In particular, the enforcement application can be configured to obtain subscriber data and network data. Based upon these data, the enforcement application can determine network congestion, available resources, available bandwidth, an allocation rate of credits for the user, a flow rate of the credits from an account to a credit pool, and a usage rate of the credits from the credit pool. In some embodiments, charging and billing systems can be configured to communicate with the user device to determine the usage rate, and the charging and billing systems can provide that information to the enforcement application as part of the subscriber data. In some embodiments, the charging and billing systems can generate one or more usage rate options and transmit the options to the user device as or within options data that can be presented at the user device. A selection or decision relating to the options can be represented in traffic management data generated at the user device and transmitted to the charging and billing systems.

The enforcement application can be configured to enforce the usage rate against a data session. The enforcement application also can be configured to issue one or more commands to the data source to control the data session. For example, the enforcement application can monitor the credit pool and apply the usage rate to the credit pool. If the credit pool runs out of credits, the enforcement application can issue commands to terminate the data session, to order a query to the user device to determine if a user wants to buy more credits, to change a guaranteed or applied QoS and/or other quality aspect of the data session, and/or to take other actions. As such, the enforcement application can use credits to control data access in networks.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for controlling data access and rate in a network will be described, according to an illustrative embodiment. The operating environment 100 shown in FIG. 1 includes a user device 102 operating in communication with and/or as part of a communications network ("network") 104. According to various embodiments, the functionality of the user device 102 can be provided by one or more mobile telephones, smartphones, or the like. The functionality of the user device 102 also can be provided by one or more personal computers ("PCs"), server computers, tablet computers, laptop computers, set-top boxes, other computing systems, and the like. For purposes of describing the concepts and technologies disclosed herein, the user device 102 is described as a smartphone. It should be understood that this embodiment is illustrative, and should not be construed as being limiting in any way.

The user device 102 can execute an operating system 106 and one or more application programs such as a traffic control application 108. The operating system 106 is a computer program for controlling the operation of the user device 102. The traffic control application 108 is an executable program configured to execute on top of the operating system 106 to provide various functionality described herein for controlling data access and rate in a network.

According to various embodiments, the traffic control application 108 can include, or can be included as a part of, a natively executed application, a Web application, and/or another type of application. The traffic control application 108 can be configured to control one or more aspects of a data session over which the user device 102 uses, obtains, and/or relies upon data 110 obtained from one or more data sources 112. For example, the traffic control application 108 can control a data session used by a Web browser application executed at the user device 102 to obtain the data 110 from the data source 112, wherein the data 110 can correspond to a Web page, multimedia content, applications, or the like. Because the data 110 can be obtained from almost any type of data source 112, it should be understood that these embodiments are illustrative, and should not be construed as being limiting in any way.

According to various embodiments, the user device 102 can generate one or more requests 114 for the data 110 and transmit the requests 114 to the data source 112. For example, the user device 102 can access a resource hosted or provided by the data source 112, and the request 114 can therefore correspond to a request to access the resource. As such, it should be understood that the user device 102 can request access to the data 110 in a number of ways such as, for example, accessing the data source 112 to use or read the data 110, requesting the data 110 explicitly by way of a request 114, and/or in other ways. In response to receiving the requests 114, the data source 112 can provide the requested data 110 by way of a data session between the data source 112 and the user device 102. According to various embodiments of the concepts and technologies disclosed herein, the user device 102 and/or other devices can be configured to control various aspects of the data session. In some embodiments described herein, the data source 112 can be configured to conduct the data session with the user device 102 in accordance with one or more commands 116 received from one or more network nodes, devices or systems. The commands 116 can set or define a bandwidth, communication speed, and/or quality of service ("QoS") of the data session. The determination of these and other aspects of the data session are described in more detail below.

In the embodiment shown in FIG. 1, a policy enforcement application or module ("enforcement application") 118 can be hosted by a computing device such as, for example, a server computer 120. In some embodiments, the enforcement application 118 and the server computer 120 can collectively provide functionality of a policy enforcement function ("PEF"), though this is not necessarily the case. The enforcement application 118 can be configured to detect the requests 114 received by the data source 112 and to issue the commands 116 for controlling one or more data sessions between the data source 112 and the user device 102, for example, a data session for providing the data 110 in response to one or more of the requests 114. It should be understood that these embodiments are illustrative, and should not be construed as being limiting in any way.

In some embodiments, the enforcement application 118 can be configured to enforce various communication policies on communications including, but not limited to, data communications between the user device 102 and the data source 112. These communication policies can be based, at least partially, upon subscription plans, network conditions, traffic conditions, user and/or network communication limits, available network resources, other information, combinations thereof, or the like. According to some embodiments, the enforcement application 118 can be configured to track and enforce user congestion credit balances and/or congestion credit accounts.

In particular, the enforcement application 118 can be configured to determine a user or device allotment of congestion credits ("credits") 122, which can be allocated to a user congestion credit allocation or account ("account") 124. The credits 122 can be allocated to the account 124 at an allocation rate $r_a$. The allocation rate $r_a$ can correspond, according to various implementations, to a subscription plan for credits 122. Thus, for example, a user subscription or credit subscription can correspond to a daily, monthly, or yearly credit allocation rate $r_a$. In some embodiments, for example, the allocation rate $r_a$ can include five hundred credits per month, one thousand credits per month, five credits per week, ten credits per day, twenty five credits per day, one credit per hour, one credit per minute, and/or other numbers of credits per any desired measure of time. Because the allocation rate $r_a$ can be almost any number and almost any time measure, it should be understood that these embodiments are illustrative, and should not be construed as being limiting in any way.

As shown in FIG. 1, the credits 122 can be allocated to the account 124 at the allocation rate $r_a$. In the above example wherein the allocation rate $r_a$ corresponds to five hundred credits per month, five hundred credits 122 can be added to an account 124 associated with a user at a designated time such as, for example, a particular day of the month, a particular point of time in a billing cycle, e.g., a month, and/or at other times. It should be understood that the enforcement application 118 may or may not maintain an account 124 for each user or device. Rather, the enforcement application 118 can obtain information such as, for example, a current balance, an allocation rate $r_a$, and an account balance to perform the functionality described herein.

According to various embodiments, the enforcement application 118 is configured to draw credits 122 from the account 124 associated with a user or device at a flow rate $r_f$. The credits 122 drawn from the account 124 can be moved into a credit pool 126 associated with the user or device. As such, the credits 122 can flow from the account 124 to the credit pool at the rate $r_f$. According to various embodiments, the enforcement application 118 moves the credits 122 from the account 124 to the credit pool 126 during any times at which the user or device is not involved in a data session. In some other embodiments, the enforcement application 118 moves the credits 122 from the account 124 to the credit pool 126 during a data session. In yet other embodiments, the enforcement application 118 moves the credits 122 from the account 124 to the credit pool 126 during times at which the user or device is involved in a data session that does not involve congested network resources.

When the enforcement application 118 begins monitoring a data session and/or enforcing policies against a data session, the enforcement application 118 can be configured to remove credits 122 from the credit pool 126 at a usage rate $r_u$. The usage rate $r_u$ can be a variable rate that can be based, at least partially, upon network conditions, user account information, available resources, available network quality of service, network congestion, network load, traffic type and/or category, geographic location of the user device 102 and/or the data source 112 between which the data session occurs, whether a user or user device 102 is roaming out of a home network, access type (e.g., secured, unsecured, or the like), speed of the devices and/or connections, other considerations, or the like, as will be explained in more detail below. In some embodiments, the usage rate $r_u$ can be expressed as a function of traffic type, quality-of-service ("QoS") level, a network congestion level, and/or other considerations. As such, in one contemplated embodiment the usage rate $r_u$ can be expressed as $\kappa*f(\theta)*g(\rho, \tau)$, wherein $\kappa$ can be a constant or variable for unit conversion and/or scaling, $f(\theta)$ can correspond to a function that represents a contribution or rate increase/decrease due to the required QoS level (e.g., providing data at twice the rate can be represented by an increase in this function, etc.), and $g(\rho,\tau)$ can correspond to a function of a congestion level $\rho$ and a traffic type $\tau$. It should be understood that this embodiment is illustrative, and should not be construed as being limiting in any way.

The credits 122 can be removed from the credit pool 126 until the credits 122 in the credit pool 126 are exhausted. Because the credits 122 can be added to the credit pool 126 at the flow rate $r_f$, it can be appreciated that the credit pool 126 can operate in accordance with a leaky bucket model. As such, the credits 122 can be added to the credit pool 126 at the flow rate $r_f$ and removed from the credit pool 126 at the usage rate $r_u$. The flow rate $r_f$ and the usage rate $r_u$ need not be equal to one another. As such, if the usage rate $r_u$ exceeds the flow rate $r_f$, the credits 122 in the credit pool 126 will eventually be exhausted. If the flow rate $r_f$ exceeds the usage rate $r_u$, the credits 122 in the credit pool 126 may never be exhausted.

According to various embodiments, the credit pool 126 can have a maximum capacity. The maximum capacity of the credit pool 126 can be attained if the flow rate $r_f$ exceeds the usage rate $r_u$, if the credit pool 126 is not being used, and/or for other reasons. If the maximum capacity of the credit pool 126 is attained, the enforcement application 118 can be configured to suspend additions of the credits 122 to the credit pool 126. Because credits 122 may only flow into the credit pool 126 during a data session, the enforcement application 118 can, by way of the maximum capacity, effectively cap the number of credits 122 in the credit pool 126. As such, the enforcement application 118 can limit, at least to some extent, a number of credits 122 that can be used during a particular data session, and as such, a user's or device's access to congested network resources.

As noted above, the enforcement application 118 can be configured to consider a number of states, operating characteristics, and/or other conditions when determining how to enforce policies against a user, device, or data session associated with a user or device. In various embodiments, the enforcement application 118 can be configured to obtain subscriber data 128. In some embodiments, the subscriber data 128 can be obtained from one or more charging and billing systems 130. The subscriber data 128 also can include subscriber information 132, which can be stored at and/or obtained from a data storage device such as a data store 134. Thus, it can be appreciated that the subscriber data 128 can include subscription information, usage information, user information, account balances, allocation rates $r_a$, QoS information, flow rates $r_f$, usage rates $r_u$, policies associated with users and/or devices, combinations thereof, or the like.

In some embodiments, the functionality of the data store 134 can be provided by one or more real or virtual resources including, but not limited to, databases, server computers, desktop computers, mobile telephones, laptop computers, other computing systems, and the like. In some embodiments, the data store 134 can correspond to a subscriber information repository or database, though this is not the case. In the illustrated embodiments, the functionality of the data store 134 is provided by a database hosted on a server computer. It should be understood that this embodiment is illustrative, and should not be construed as being limiting in any way.

As is explained in more detail below, particular with reference to FIGS. 2 and 5B, the charging and billing systems 130 can be configured to communicate with the user device 102 to obtain traffic management data 136 and/or include at least a portion of the traffic management data 136 in the subscriber data 128. The traffic management data 136 can include user preferences, options, and/or settings such as, for example, data usage options, or the like. The traffic management data 136 also can include user selections and/or traffic management decisions, which can be made at the user device 102 before, during, and/or after initiation of a data session.

In addition to the subscriber data 128, the enforcement application 118 also can be configured to obtain network information, statistics, and/or analytics ("network data") 138. In particular, the enforcement application 118 can be configured to obtain, receive, and/or request network data 138 that can be analyzed and/or interpreted by the enforcement application 118 to determine network congestion and/or other conditions that may affect policies enforced against the user, device, and/or data session requested by the requests 114. The network data 138 can be obtained from one or more network reporting systems or devices ("network reporting device") 140. The network reporting device 140 can include various devices, systems, reporting mechanisms, network control systems, or the like.

In some embodiments, the enforcement application 118 can be configured to detect a data session request such as the request 114, and to determine, based upon various data including, but not limited to, the subscriber data 128 and the network data 138, how a data session requested by the data session request is to be established. In other words, the enforcement application 118 can determine one or more options for the data session with regard to QoS levels, timing, devices to be used, usage rates $r_u$, other factors, or the like. The charging and billing systems 130 can determine one or more data session options that include, for example, a QoS determination, a usage rate $r_u$ determination, and/or the like, and transmit these options to the user device 102 for a decision. The options can be transmitted to the user device 102 as options data 142. The traffic control application 108 can load the options data 142 into a user interface for presentation at the user device 102, obtain a selection of an option, generate the traffic management data 136 that includes the selection, and transmit the traffic management data 136 to the charging and billing systems 130.

The charging and billing systems 130 can update the subscriber data 128 in accordance with the selection at the user device 102 and the enforcement application 118 can enforce the determined policies on the data session. During enforcement, the enforcement application 118 can apply the determined usage rate $r_u$ and monitor the credit pool 126. The enforcement application 118 also can issue commands 116 to control the data session based upon the monitoring. These and other aspects of enforcement are described in additional detail below, particularly with reference to FIG. 4.

In operation of various embodiments of the concepts and technologies disclosed herein, an application or service requests data 110. For example, an application program executing at the user device 102 can request data 110 from a data source 112 by way of a request 114, which the user device 102 can transmit to the data source 112. The data source 112 can be configured to call or access the enforcement application 118 and/or to provide the functionality described herein with respect to the enforcement application 118. For example, the enforcement application 118 can be called or accessed by way of one or more application programming interfaces ("APIs") exposed by the enforcement application 118 and/or a device executing the enforcement application 118 such as, for example, the server computer 120.

In some other embodiments, the enforcement application 118 can be configured to enforce policies against a user, device, and/or data session without being called and/or otherwise requested. In some other embodiments, the data source 112 and/or an application or service executing on or in association with the data source 112 or elsewhere can be configured to provide the functionality of the enforcement application 118 and/or to call or access the enforcement application 118. Thus, it should be understood that the enforcement application 118 can operate as an application on one or more devices and/or can operate as a service and can respond to calls from various entities or devices such as, for example, the data source 112.

The enforcement application 118 can be configured to obtain subscriber data 128 and network data 138 to determine an allocation rate $r_a$, a flow rate $r_f$, and a usage rate $r_u$. In some embodiments the charging and billing systems 130 can be configured to communicate with the user device 102 during setup of the data session (and/or at other times during the data session) to determine the usage rate $r_u$ and/or other rates associated with the functionality of the enforcement application 118 described herein. In particular, the charging and billing systems 130 can generate one or more usage rate options and transmit the options to the user device 102 as the options data 142. The traffic control application 108 can load the options data 142 into a display and obtain a selection from the user or other entity at the user device 102. The selection or decision can be represented in traffic management data 136 generated at the user device 102 and transmitted to the charging and billing systems 130.

The enforcement application 118 can begin enforcing the usage rate $r_u$, the flow rate $r_f$, and/or the allocation rate $r_a$ based upon the network data 138 and the subscriber data 128. It can be appreciated that in various embodiments, the usage rate $r_u$ can be higher at times of network congestion relative to a lower usage rate $r_u$ at a time of relatively lower network congestion. As such, the usage rate $r_u$ can be a dynamic value or function that can be used to dynamically control data access based upon network congestion, traffic type, and/or other factors as explained herein. The usage rate $r_u$ also can be changed during a data session in response to changing network conditions, either by the enforcement application 118 without user input and/or by sending options data 142 to the user device 102 for a determination as explained above. Because other considerations can be used to raise and/or lower usage rates $r_u$, it should be understood that these embodiments are illustrative, and should not be construed as being limiting in any way.

Based upon the usage rate $r_u$, the subscriber data 128, the network data 138, and credit balances, the enforcement application 118 can issue one or more commands 116 to the data source 112 to control the data session. For example, during the data session, the enforcement application 118 can monitor the credit pool 126. If the credit pool 126 runs out of credits 122, the enforcement application 118 can issue commands 116 to terminate the data session, ask a user to purchase more credits, change a guaranteed or applied QoS and/or other quality aspect of the data session, take other actions, or the like. As such, the enforcement application 118 can issue a command 116 to terminate the data session. Because the commands 116 can be issued at other times and/or under other circumstances, it should be understood that these embodiments are illustrative, and should not be construed as being limiting in any way.

FIG. 1 illustrates one user device 102, one network 104, one data source 112, one server computer 120, one instance of the charging and billing systems 130, one data store 134, and one network reporting device 140. It should be understood, however, that various implementations of the operating environment 100 include multiple user devices 102, multiple networks 104, multiple data sources 112, multiple server computers 120, multiple instances of the charging and billing systems 130, multiple data stores 134, and/or multiple network reporting devices 140. As such, the illustrated embodiment should be understood as being illustrative, and should not be construed as being limiting in any way.

Figure 2:
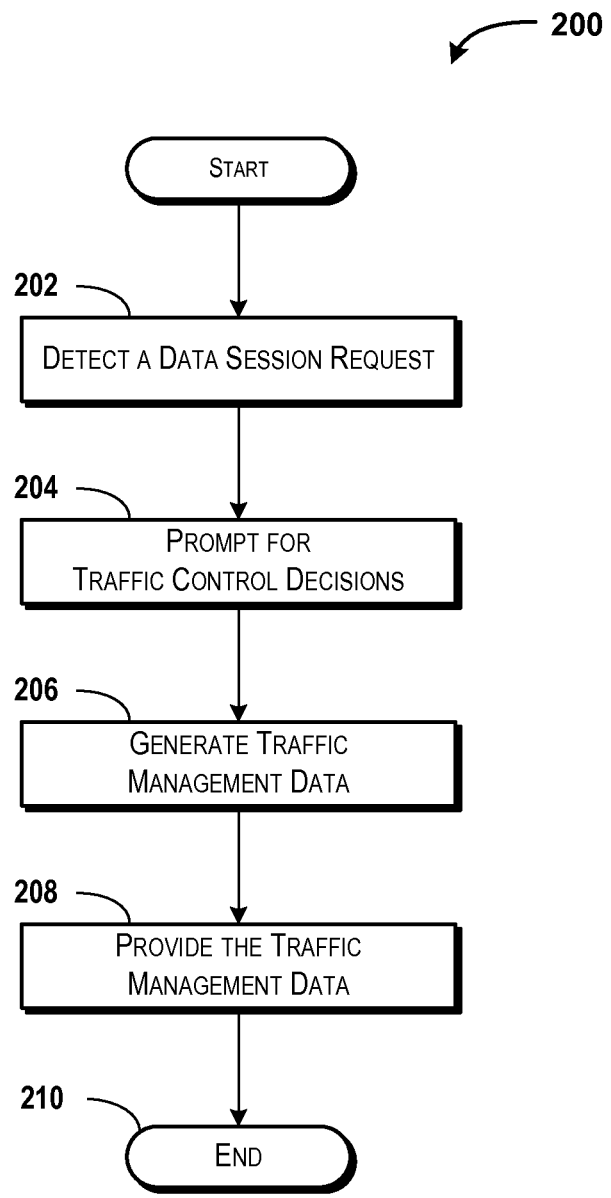
FIG. 2 is a flow diagram showing aspects of a method for generating traffic management data, according to an illustrative embodiment.

Turning now to FIG. 2, aspects of a method 200 for generating traffic management data will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the user device 102 and/or the server computer 120 to perform one or more operations and/or causing the processor to direct other components of the computing system or device to perform one or more of the operations.

For purposes of illustrating and describing the concepts of the present disclosure, the methods disclosed herein are described as being performed by the user device 102 via execution of one or more software modules such as, for example, the traffic control application 108. It should be understood that additional and/or alternative devices and/or network nodes can provide the functionality described herein via execution of one or more modules, applications, and/or other software including, but not limited to, the traffic control application 108. Thus, the illustrated embodiments are illustrative, and should not be viewed as being limiting in any way.

The method 200 begins at operation 202, wherein the user device 102 detects a data session request or generates a request to begin a data session. Detecting the data session request in operation 202 can correspond to detecting that the user device 102 has requested data 110 from the data source 112; that the user device 102 has initiated an application program that uses data 110 from the data source 112; that the user device 102 has requested access to the data source 112; that the user device 102 has submitted data to the data source 112; and/or detecting other data communications between the user device 102 and the data source 112 that can correspond to initiation of a data session. It should be understood that that the data session request detected in operation 202 can correspond to any type of request for data communications between one or more devices operating on or in communication with the network 104. As such, it should be understood that the above example embodiments are illustrative, and should not be construed as being limiting in any way.

From operation 202, the method 200 proceeds to operation 204, wherein the user device 102 prompts for one or more traffic control decisions. As explained above, and as will be illustrated and described below with reference to FIG. 5B, the user device 102 can be configured to obtain options data 142 from the charging and billing systems 130. The options data 142 can include one or more data session options for presentation at the user device 102.

In particular, the user device 102 can be configured to execute the traffic control application 108 to generate and/or present a display screen and/or other user interface for presenting the one or more data session options included in the options data 142. Similarly, the user device 102 can be configured to obtaining a choice, decision, or selection (referred to herein as a "traffic control decision"). The traffic control decision can indicate a decision, selection, or choice regarding a QoS for the data session, a credit usage rate $r_u$, other rates, or the like. Thus, while not explicitly shown in FIG. 2, the user device 102 can obtain the options data 142 and generate one or more for presentation at the user device 102.

From operation 204, the method 200 proceeds to operation 206, wherein the user device 102 can generate the traffic management data 136 for communication to the charging and billing systems 130. The traffic management data 136 generated in operation 206 can include the choice or selection made at the user device in operation 204. As explained above with reference to FIG. 1, the traffic management data 136 generated by the user device 102 also can include account options or settings such as, for example, subscription plan information, or the like, though this information may or may not be included in the traffic management data 136 generated in operation 206.

From operation 206, the method 200 proceeds to operation 208, wherein the user device 102 can provide the traffic management data 136 to one or more entities. In various embodiments, the user device 102 can provide the traffic management data 136 to the charging and billing systems 130 and/or other nodes or entities for use in generating enforcement decisions. As such, the method 200 can be executed by the user device 102 to prompt a user for a data session option and to communicate a choice or decision of the user to a network device or other entity.

From operation 206, the method 200 proceeds to operation 208. The method 200 ends at operation 208.

Figure 3:
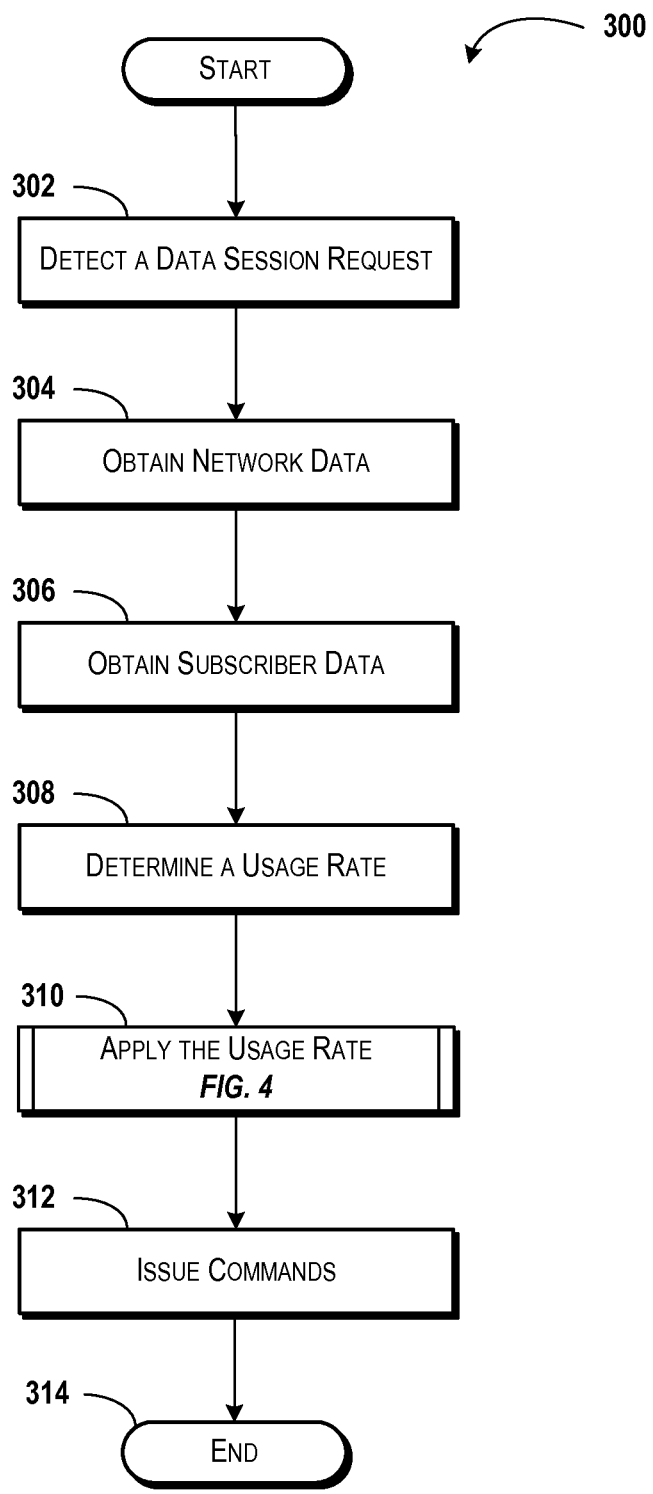
FIG. 3 is a flow diagram showing aspects of a method for controlling network traffic, according to another illustrative embodiment.

Turning now to FIG. 3, aspects of a method 300 for controlling network traffic will be described in detail, according to an illustrative embodiment. For purposes of illustrating and describing the concepts of the present disclosure, the method 300 is described as being performed by the server computer 120 via execution of one or more software modules such as, for example, the enforcement application 118. It should be understood that additional and/or alternative devices and/or network nodes can provide the functionality described herein via execution of one or more modules, applications, and/or other software including, but not limited to, the enforcement application 118. Thus, the illustrated embodiments are illustrative, and should not be viewed as being limiting in any way.

The method 300 begins at operation 302, wherein the server computer 120 detects a data session request. As explained above, detecting the data request in operation 302 can correspond to detecting, at the server computer 120, that a device such as the user device 102 has requested data 110 from the data source 112 and/or detecting other data communications between the user device 102 and the data source 112. It should be understood that that the data request detected in operation 302 can correspond to any type of request for data communications between one or more devices operating on or in communication with the network 104. As such, it should be understood that the above example embodiments are illustrative, and should not be construed as being limiting in any way.

From operation 302, the method 300 proceeds to operation 304, wherein the server computer 120 obtains network data 138 and/or other network or traffic information and/or analytics. In some embodiments, one or more reporting mechanisms such as the network reporting device 140 can submit network data such as the network data 138 to the server computer 120. In some other embodiments, the server computer 120 can request network data such as the network data 138 from the one or more reporting mechanisms such as the network reporting device 140 and receive the network data 138 in response to the request.

As explained above, the network data 138 can include, but is not limited to, data indicating used and/or available network bandwidth; network congestion; resource availability information; other information; combinations thereof; or the like. Because other types of network data can be obtained in operation 304, it should be understood that these embodiments are illustrative, and should not be construed as being limiting in any way.

From operation 304, the method 300 proceeds to operation 306, wherein the server computer 120 obtains subscriber data 128. As explained above, the subscriber data 128 obtained in operation 306 can include subscription plans, usage information, usage limits, credit balances and/or rates associated with the credits, other information relating to the user device 102 or a user associated with the user device 102, combinations thereof, or the like. The subscriber data 128 also can include information obtained by the charging and billing systems 130 with regard to one or more data session options. As such, it should be understood that the subscriber data 128 obtained in operation 306 can include and/or can be based upon the traffic management data 136 generated by the user device 102 in the method 200 described above. Because the subscriber data 128 can include additional and/or alternative information, it should be understood that this embodiment is illustrative, and should not be construed as being limiting in any way.

From operation 306, the method 300 proceeds to operation 308, wherein the server computer 120 determines a usage rate $r_u$. The usage rage $r_u$ determined by the server computer 120 in operation 308 can be based, at least partially, upon the subscriber data 128 and/or the network data 138. As such, the usage rate $r_u$ can vary based upon network conditions, subscription plans, or the like. In some embodiments, for example, the usage rate $r_u$ can increase as network congestion increases, and can decrease as network congestion decreases, though this is not necessarily the case. Additionally, as explained above, the server computer 120 can determine the usage rate $r_u$ based upon a user selection. As such, a user can select a usage rate $r_u$ for a particular data session, if desired, and the server computer 120 can use that usage rate $r_u$ during the data session. Additional details of a user selecting the usage rate $r_u$ are explained below with reference to FIG. 5B.

From operation 308, the method 300 proceeds to operation 310, wherein the server computer 120 can apply the usage rate $r_u$ to the data session. According to various embodiments, the server computer 120 can monitor the credit pool 126 and/or a balance of credits 122 in the credit pool 126. As a time corresponding to the usage rate $r_u$ passes, the server computer 120 can remove one credit 122 from the credit pool 126. Thus, for example, if the usage rate $r_u$ corresponds to one credit per minute, the server computer 120 can maintain a timer. At the expiration of one minute, the server computer 120 can remove a credit 122 from the credit pool 126 and restart the timer. This can continue as long as the data session is in progress. Additional details of applying the usage rate $r_u$ to the data session are illustrated and described below with reference to FIG. 4.

From operation 310, the method 300 proceeds to operation 312, wherein the server computer 120 can issue one or more commands 116. The commands 116 issued by the server computer 120 can cause the data source 112 to initiate the data session, continue the data session, and/or terminate the data session. The commands 116 issued by the server computer 120 also can prompt the data source 112 to change a QoS associated with the data session and/or otherwise to modify various aspects of the data session. Thus, the commands 116 can prompt the data source 112 to allow/restrict traffic associated with the data session in accordance with the usage rate $r_u$ determined in operation 308.

From operation 312, the method 300 proceeds to operation 314. The method 300 ends at operation 314.

Figure 4:
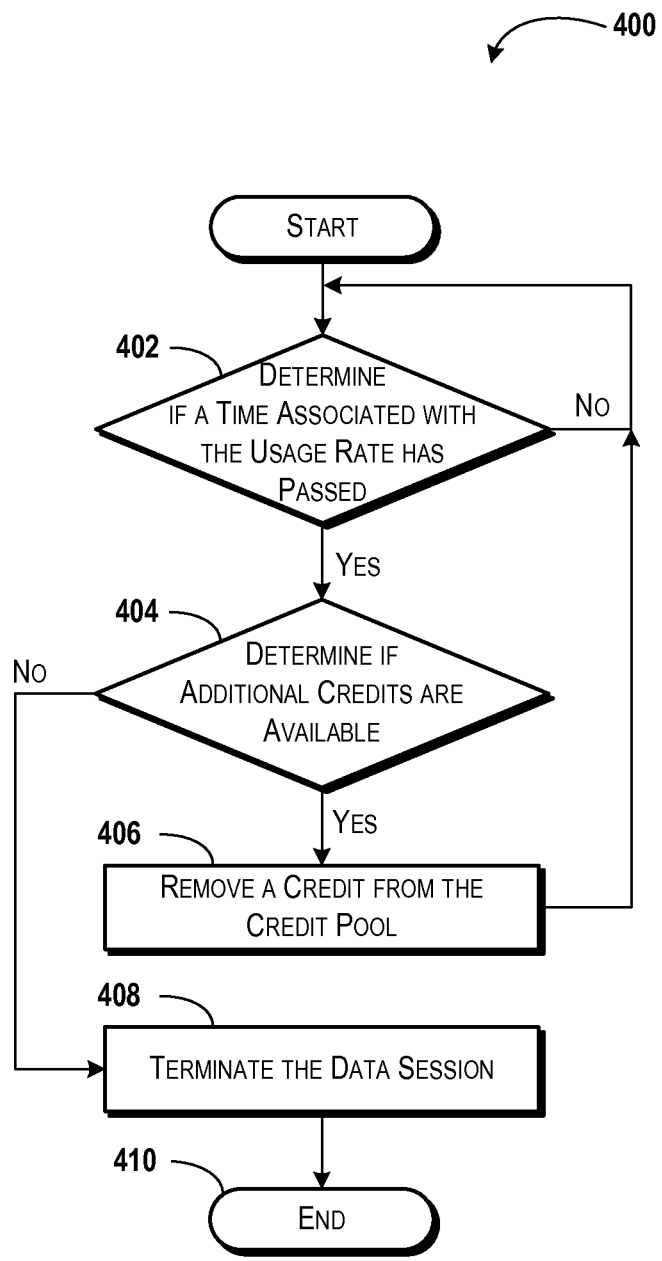
FIG. 4 is a flow diagram showing aspects of a method for applying a usage rate during a data session, according to another illustrative embodiment.

Turning now to FIG. 4, aspects of a method 400 for applying the usage rate to the data session will be described in detail, according to an illustrative embodiment. The functionality of the method 400 can, but does not necessarily, correspond to operation 310 of the method 300 illustrated and described with reference to FIG. 3 above. For purposes of illustrating and describing the concepts of the present disclosure, the method 400 is described as being performed by the server computer 120 via execution of one or more software modules such as, for example, the enforcement application 118. It should be understood that additional and/or alternative devices and/or network nodes can provide the functionality described herein via execution of one or more modules, applications, and/or other software including, but not limited to, the enforcement application 118.

Thus, the illustrated embodiments are illustrative, and should not be viewed as being limiting in any way.

The method 400 begins at operation 402, wherein the server computer 120 determines if a time associated with the usage rate $r_u$ determined in operation 308 of the method 300 has passed. As mentioned above, the server computer 120 can maintain a timer. The server computer 120 can determine a time corresponding to and/or associated with the usage rate $r_u$ determined in operation 308 of the method 300 described above. Thus, for example, if the usage rate is fifteen credits per minute, the server computer 120 can determine that the time associated with the usage rate $r_u$ is four seconds. The server computer 120 can start the timer, and at the expiration of the timer, the server computer 120 can determine that the time associated with the usage rate $r_u$ has passed. Because other usage rates $r_u$ are possible and are contemplated, it should be understood that this example is illustrative, and should not be construed as being limiting in any way.

If the server computer 120 determines, in operation 402 that the time associated with the usage rate $r_u$ has not passed, the method 400 can return to operation 402. As such, it can be appreciated that execution of the method 400 can pause and/or reiterate operation 402 until the server computer determines, in any iteration of operation 402, that the time associated with the usage rate $r_u$ has passed. If the server computer 120 determines in operation 402 that the time associated with the usage rate $r_u$ has passed, the method 400 can proceed to operation 404.

In operation 404, the server computer 120 determines if additional credits 122 are available in the credit pool 126 associated with the user device 102 and/or a user of the user device 102. If the server computer 120 determines in operation 404 that one or more additional credits 122 are available in the credit pool 126, the method 400 can proceed to operation 406. In operation 406, the server computer 120 can remove a credit 122 from the credit pool 126. Therefore, it can be appreciated that by executing operations 402-406, the server computer 120 can remove a credit 122 from the credit pool 126 at a rate that is equal to the usage rate $r_u$. From operation 406, the method 400 can return to operation 402, and the server computer 120 can again determine if the time associated with the credit usage rate $r_u$ has passed. Although not shown in FIG. 4, the server computer 120 also can restart a timer, if used, before, upon, and/or after returning to operation 402.

If the server computer 120 determines in operation 404 that additional credits 122 are not available in the credit pool 126, the method 400 proceeds to operation 408. In operation 408, the server computer 120 can determine that the data session is to be terminated. Although not explicitly illustrated in FIG. 4, it should be understood that server computer 120 also can be configured to cause the charging and billing systems 130 to communicate with the user device 102 to prompt a user or other entity to buy additional credits 122. In some embodiments, the server computer 120 and/or the charging and billing systems 130 also can be configured to prompt a user to increase the flow rate $r_f$ instead of terminating the session as shown at operation 408. Thus, instead of terminating a session due to determining that additional credits 122 are not available in the credit pool 126, the server computer 120 and/or other systems or devices can allow a user to modify the flow rate $r_f$, buy additional credits 122, and/or take other actions to prevent termination of the session. As such, the illustrated example of method 400 should be understood as being one contemplated embodiment and should not be construed as being limiting in any way.

From operation 408, the method 400 proceeds to operation 410. The method 400 ends at operation 410.

While the method 400 is described as using a usage rate $r_u$ that is time-based, it should be understood that other usage rates $r_u$ are contemplated and are possible. In particular, a usage rate $r_u$ can be defined as a number of request, a number of bytes, and/or other numbers or amounts. Thus, in some embodiments the method 400 can track a number of bytes transferred instead of, or in addition to, tracking a time associated with the usage rate $r_u$. In one example embodiment, the server computer 120 can be configured to determine if a number of bytes associated with the usage rate $r_u$ determined in operation 308 of the method 300 have been transferred. Thus, for example, if the usage rate is five hundred kilobytes, the server computer 120 can start a counter or request monitoring of a data stream to determine when five hundred kilobytes have been transferred. It should be understood that the usage rate $r_u$ can vary over time due to changing network conditions and as such, the enforcement and/or monitoring of the number of bytes can be adjusted based upon a variable usage rate $r_u$ and/or flow rate $r_f$.

When the specified number of bytes has been transferred, the server computer 120 can be configured to remove a credit 122 from the credit pool 126 as discussed above if credits 122 remain in the credit pool 126. As explained above, if credits 122 do not remain in the credit pool 126, the server computer 120 can communicate with the user and/or instruct other devices or systems such as the charging and billing systems 130 to communicate with the user to increase the flow rate $r_f$, purchase additional credits 122, reduce the usage rate $r_u$, and/or take other actions. If the user declines to take any action, the server computer 120 can terminate the session. Thus, it can be appreciated that various types of usage rates $r_u$ can be enforced by the server computer 120. Because the above example is illustrative of only one contemplated embodiment, it should be understood that this example embodiment is illustrative, and should not be construed as being limiting in any way.

Figure 5A:
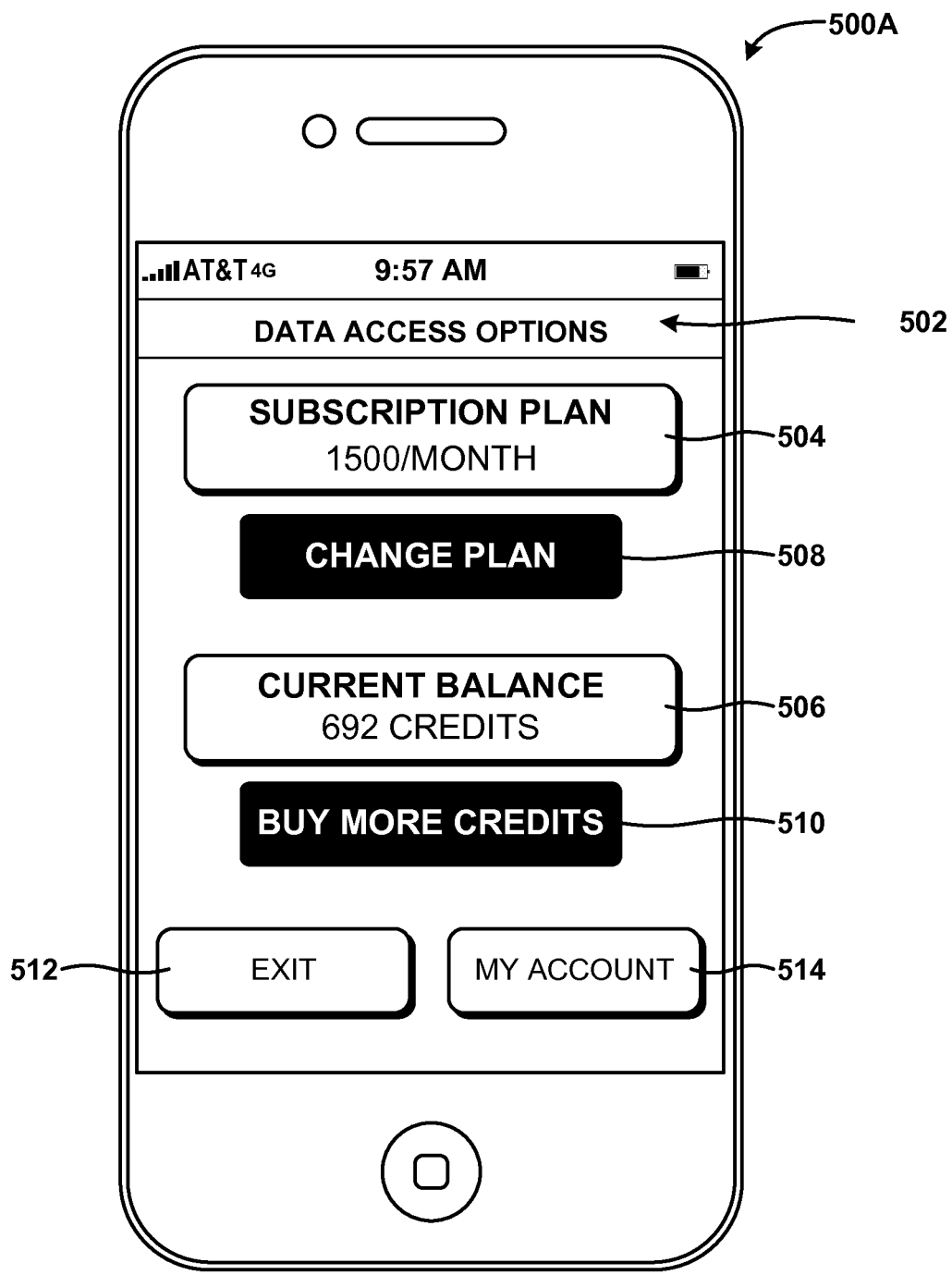
FIGS. 5A-5B are user interface ("UI") diagrams showing aspects of UIs for controlling data access and rate in a network, according to some illustrative embodiments.
Figure 5B:
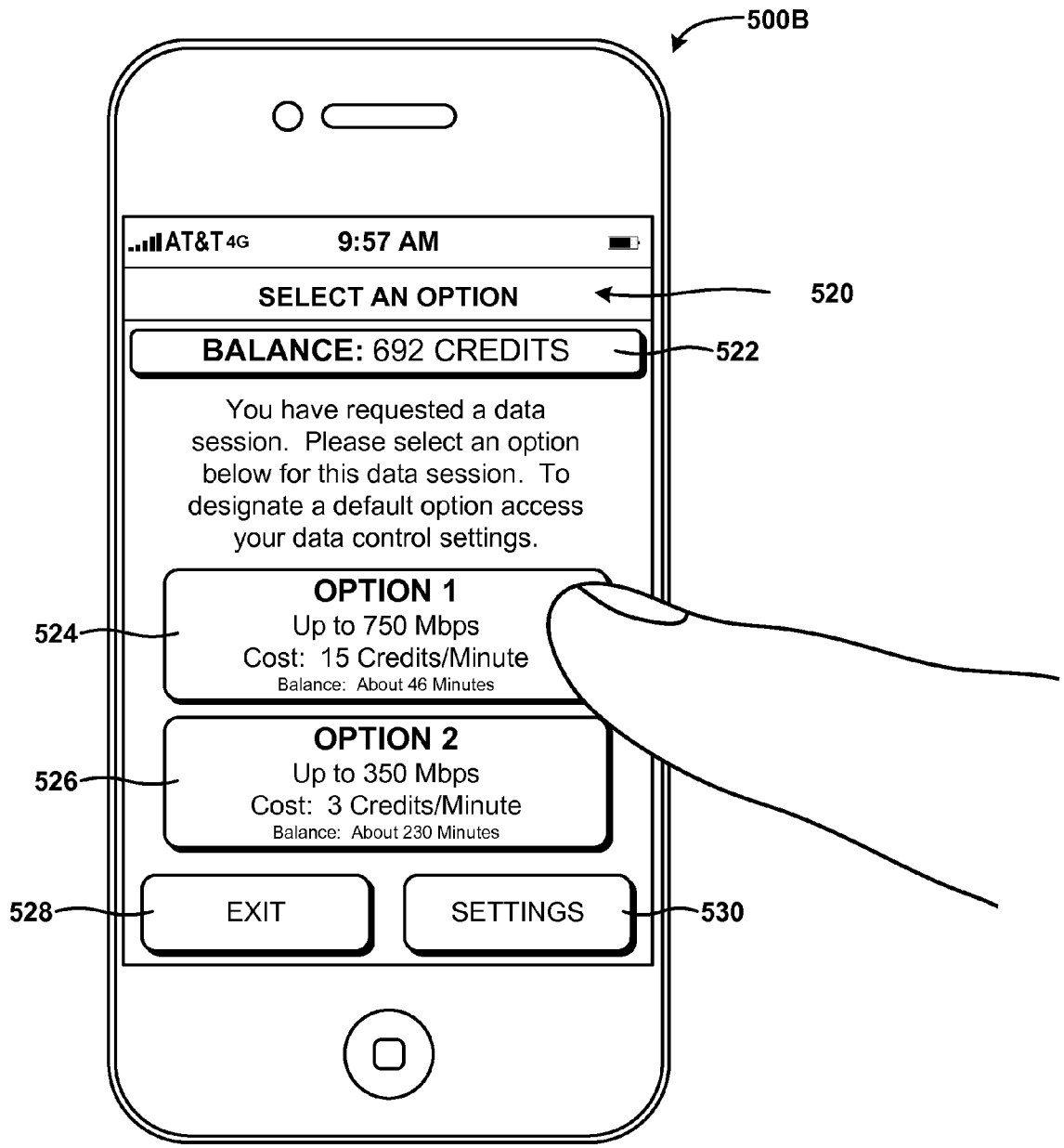

Turning now to FIGS. 5A-5B, UI diagrams showing various aspects of the concepts and technologies disclosed herein for controlling data access and rate in a network will be described according to various illustrative embodiments. FIG. 5A shows an illustrative screen display 500A generated by a device such as the user device 102. According to various embodiments, the user device 102 can generate the screen display 500A and/or other screen displays in conjunction with and/or based upon data received from the traffic control application 108, the enforcement application 118, the charging and billing systems 130, and/or other devices or systems as described herein. As explained above, the concepts and technologies disclosed herein for controlling data access and rate in a network can be provided by one or more applications or modules executed by the user device 102 and/or by a device remote from the user device 102 such as, for example, the server computer 120. It should be appreciated that the UI diagram illustrated in FIG. 5A is illustrative of one contemplated embodiment, and therefore should not be construed as being limited in any way.

Although not shown in FIG. 5A, the screen display 500A can include various menus and/or menu options such as options for returning to a previous screen, exiting the current application or screen, advancing to a next screen, and/or other options. It also should be understood that the screen display 500A and/or other screen displays can be provided at almost any time during operation of the user device 102. In FIG. 5A, the user device 102 is illustrated as displaying a user interface for setting and/or modifying one or more data access options. The screen display 500A can include a data access options screen 502 for presenting and/or allowing modification of one or more data access options.

In the embodiment shown in FIG. 5A, the data access options screen 502 includes a subscription plan field 504. The subscription plan field 504 can present data for informing a user or other entity of a credit subscription plan. In the illustrated embodiment, the subscription plan field 504 presents data indicating a subscription plan of one thousand five hundred credits per month. It can be appreciated from the description of FIG. 1 above that one thousand five hundred credits per month can correspond to an allocation rate $r_a$ of credits 122 to an account 124, though this is not necessarily the case. The screen display 500A also can include a current balance field 506 for displaying a current balance of credits 122 associated with the user device 102. Thus, the current balance field 506 can be used to display a balance of the account 124. Thus, a user or other entity can view the data access options screen 502 to determine a subscription plan and credit balance associated with the user, the user device 102, and/or another entity.

The data access options screen 502 also can include a UI control 508 for changing a subscription plan associated with the user device 102. Selection of the UI control 508 and/or other types of input such as voice commands, touch commands, keystrokes, or the like can cause the user device 102 to change a credit subscription plan. In some embodiments, selection of the UI control 508 can cause the user device 102 to exchange traffic management data 136 with the charging and billing systems 130 and/or other devices or systems to modify the credit subscription plan. Similarly, the data access options screen 502 can include a UI control 510 for purchasing credits 122. Selection of the UI control 510 can cause the user device 102 to begin a credit purchase process. In some embodiments, selection of the UI control 510 can cause the user device 102 to exchange the traffic management data 136 with the charging and billing systems 130 and/or other devices or systems to purchase credits 122.

Thus, a user or other entity can, by way of interacting with the data access options screen 502, view a credit subscription plan, modify a credit subscription plan, view a credit balance, and/or purchase credits 122. The data access options screen 502 also can include a UI control 512 for exiting the data access options screen 502 and/or a UI control 514 for accessing an account associated with the user device 102 and/or a user or other entity associated with the user device 102. Because additional or alternative fields and/or UI controls can be included in the screen display 500A, and/or because additional or alternative actions can be taken in response to selection of the UI controls 508, 510, 512, 514 included in the screen display 500A, it should be understood that these embodiments are illustrative, and should not be construed as being limiting in any way.

Referring now to FIG. 5B, a UI diagram showing additional aspects of the concepts and technologies disclosed herein for controlling data access and rate in a network are described in detail. In particular, FIG. 5B shows a screen display 500B generated by a device such as the user device 102. In some embodiments, the screen display 500B can be generated by the user device 102 in response to receiving options data 142 from the billing and charging systems 130. According to some other embodiments, the screen display 500B can be generated by the user device 102 in response to detecting a tap, touch, gesture, keystroke, voice command, or other input for accessing data access settings or options, purchasing credits 122, changing a credit subscription plan, or the like.

In yet other embodiments, the screen display 500B can be presented by the user device 102 in response to detecting a data access request such as the request 114. Thus, it should be understood that presentation of the screen display 500B and/or other screen displays can correspond to prompting for a traffic control decision as illustrated and described above with reference to operation 204 of the method 200. Because the screen display 500B can be presented at additional and/or alternative times, it should be understood that these embodiments are illustrative, and should not be construed as being limiting in any way.

The screen display 500B can include a data access option display 520 for displaying a credit balance; presenting one or more data access options and/or credit usage rates for selection by a user; viewing account information and/or application settings; combinations thereof, or the like. In particular, data access options display 520 can include a credit balance field 522. The credit balance field 522 can display a balance of credits 122 associated with the user and/or the user device 102. Although not shown in FIG. 5B, it should be understood that the data access option display 520 also can include a UI control for purchasing credits 122 and/or changing a credit subscription plan. Because the data access option display 520 can include additional and/or alternative controls, fields, and/or information, it should be understood that the illustrated embodiment is illustrative, and should not be construed as being limiting in any way.

The data access option display 520 can display information for informing a user or other entity that a data session has been requested. The data access option display 520 also can include a UI control 524. The UI control 524 can present a first data access option for use during the requested data session. In the illustrated embodiment, the UI control 524 displays an option for conducting the requested data session at a bandwidth of up to seven hundred fifty megabits per second (Mbps), though other quality of service levels and/or grades can be displayed in addition to, or instead of, seven hundred fifty Mbps. The UI control 524 also displays a cost of this option, in terms of credits 122 and/or a credit usage rate $r_u$. In the illustrated embodiment, the credit usage rate $r_u$ associated with the UI control 524 corresponds to fifteen credits 122 per minute. Thus, selection of this option, based upon a current credit balance, is illustrated as corresponding to about forty six minutes of data communications before the credits 122 are exhausted. It should be understood that this embodiment is illustrative, and should not be construed as being limiting in any way.

According to various embodiments, selection of the UI control 524 can cause the user device 102 to generate the traffic management data 136 and to transmit the traffic management data 136 to the charging and billing systems 130 indicating the data access option. The charging and billing systems 130 can also be configured to communicate this choice to the enforcement application 118 as or with subscriber data 128 for controlling the requested data session. Thus, as explained above with reference to FIG. 1, the enforcement application 118 can begin applying the credit usage rate $r_u$ associated with the first data access option.

The data access option display 520 also includes a UI control 526. The UI control 526 presents a second data access option for use during the requested data session. In the illustrated embodiment, the UI control 526 displays an option for conducting the requested data session at a bandwidth of up to three hundred fifty Mbps, though other QoS levels and/or grades can be displayed in addition to, or instead of, three hundred fifty Mbps. The UI control 526 also displays a cost of this option, in terms of credits 122 and/or a credit usage rate $r_u$. In the illustrated embodiment, the credit usage rate $r_u$ associated with the UI control 526 can correspond to three credits 122 per minute. As such, selection of the second option, based upon a current credit balance of six hundred ninety two credits 122, can correspond to about two hundred thirty minutes of data communications before the credits 122 are exhausted. It should be understood that this embodiment is illustrative, and should not be construed as being limiting in any way.

According to various embodiments, selection of the UI control 526 can cause the user device 102 to generate the traffic management data 136 and to transmit the traffic management data 136 to the charging and billing systems 130 and/or other network nodes, devices, or the like. The traffic management data 136 can indicate that the user or other entity has selected the second data access option. The charging and billing systems 130 can also be configured to communicate the choice of the second data access option as or within the subscriber data 128 to the enforcement application 118 to control the requested data session. Thus, as explained above with reference to FIG. 1, the enforcement application 118 can begin applying the credit usage rate $r_u$ associated with the second data access option.

The screen display 500B also can include a UI control 528 for exiting the data access options and/or the data access option display 520. The screen display 500B also can include a UI control 530 for accessing one or more settings associated with the data access control functionality disclosed herein. Thus, selection of the UI control 528 can cause the user device 102 to stop displaying the data access option display 520 and selection of the UI control 530 can cause the user device 102 to begin displaying options or settings associated with the data access control functionality described herein. It should be understood that these embodiments are illustrative, and should not be construed as being limiting in any way.

While the screen display 500B is illustrated as displaying two data access options, corresponding to the fields 524, 526, it should be understood that less than two data access options, two data access options, and/or more than two data access options can be displayed on the screen display 500B in accordance with the concepts and technologies disclosed herein. Thus, the illustrated embodiment is illustrative and should not be construed as being limiting in any way.

In the above description of FIGS. 1-5B, the enforcement application 118 and the traffic control application 108 have been described as executing various functions to provide the functionality described herein for controlling data access in the network 104. It should be understood that the traffic control application 108 and the enforcement application 118, as well as other entities and/or application illustrated and described herein, can communicate with one another and/or work together in a synchronized manner to provide the functionality described herein. For example, the traffic control application 108 and the enforcement application 118 can communicate with each other to ensure that credits 122 are issued and/or deducted in a timely manner. Because other communications between the various entities illustrated in FIG. 1 and/or described herein are contemplated and are possible, it should be understood that this example of communications between these is illustrative and should not be construed as being limiting in any way.

Figure 6:
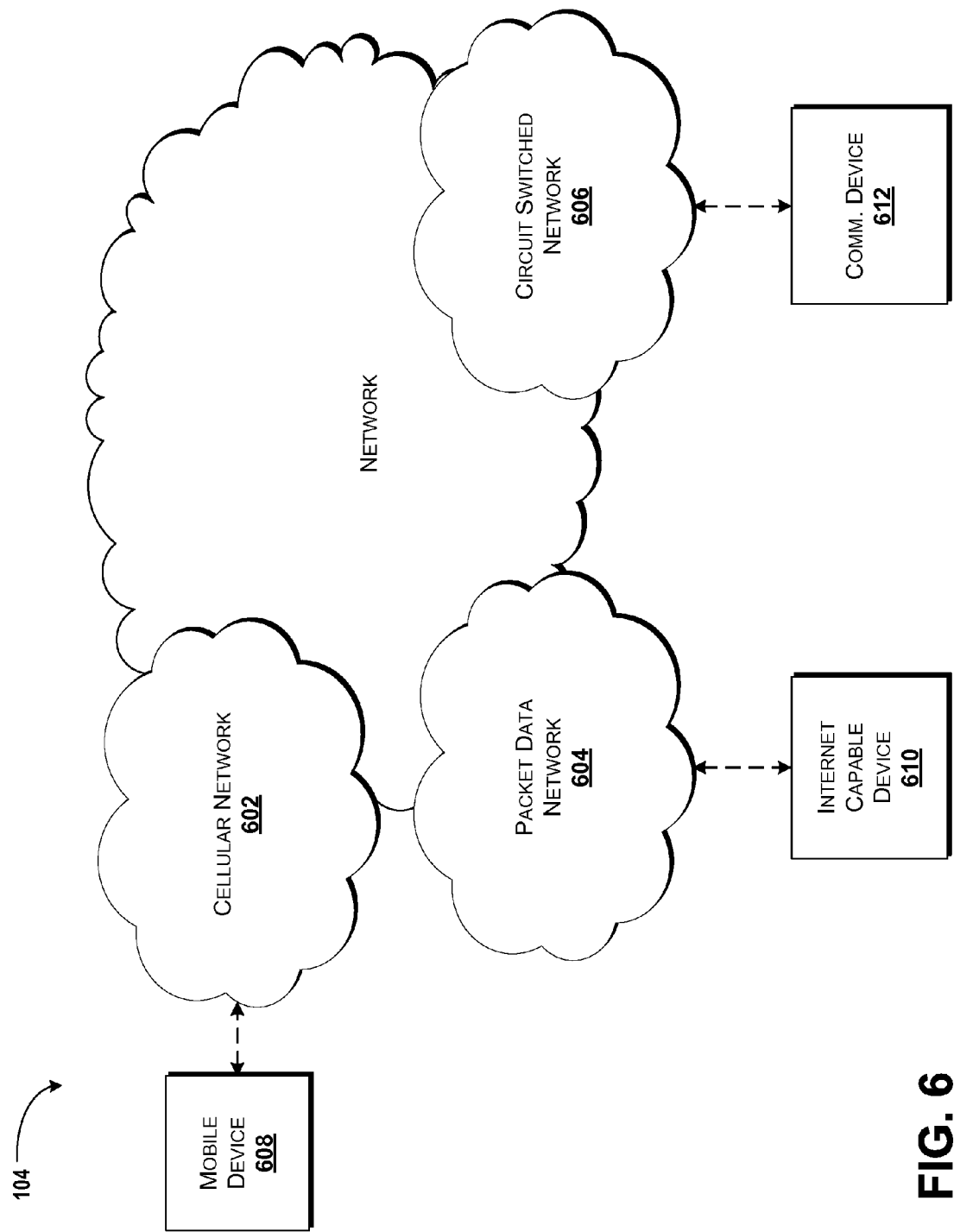
FIG. 6 schematically illustrates a network, according to an illustrative embodiment.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
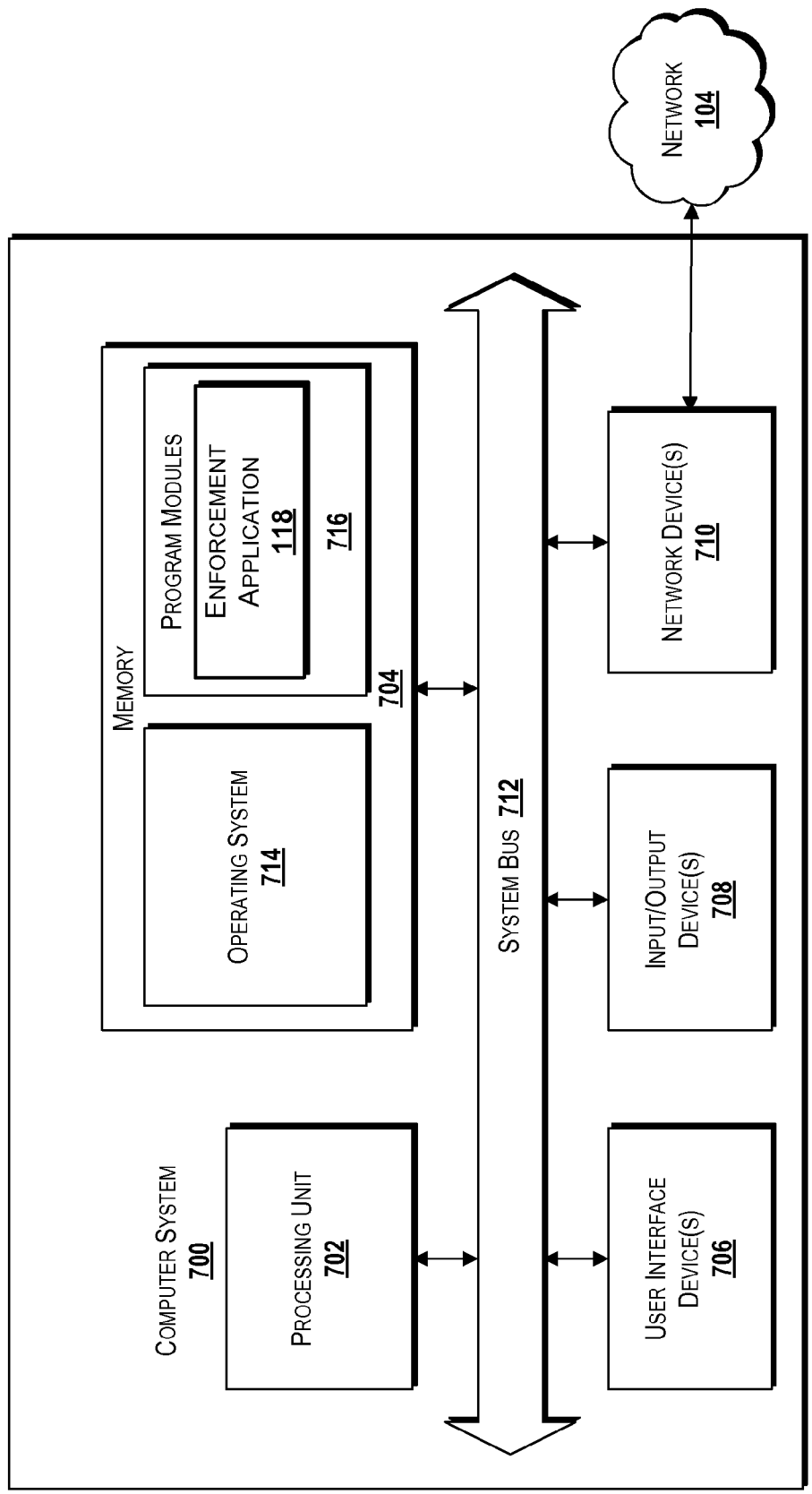
FIG. 7 is a block diagram illustrating an example computer system configured to control data access in a network, according to some illustrative embodiments.

FIG. 7 is a block diagram illustrating a computer system 700 configured to provide the functionality described herein for a verification service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally know, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the enforcement application 118. Additionally, some embodiments of the computer system 700 can include, in the program modules 716, applications, programs, or modules for providing the functionality described herein with respect to the charging and billing systems 130 and the network reporting devices 140. These and/or other programs can be embodied in computer-readable media containing instructions that, when executed by the processing unit 702, perform one or more of the methods 300, 400 described in detail above with respect to FIGS. 3-4. According to embodiments, the program modules 716 may be embodied in hardware, software, firmware, or any combination thereof. Although not shown in FIG. 7, it should be understood that the memory 704 also can be configured to store the subscriber data 128, the subscriber information 132, the network data 138, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof, does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
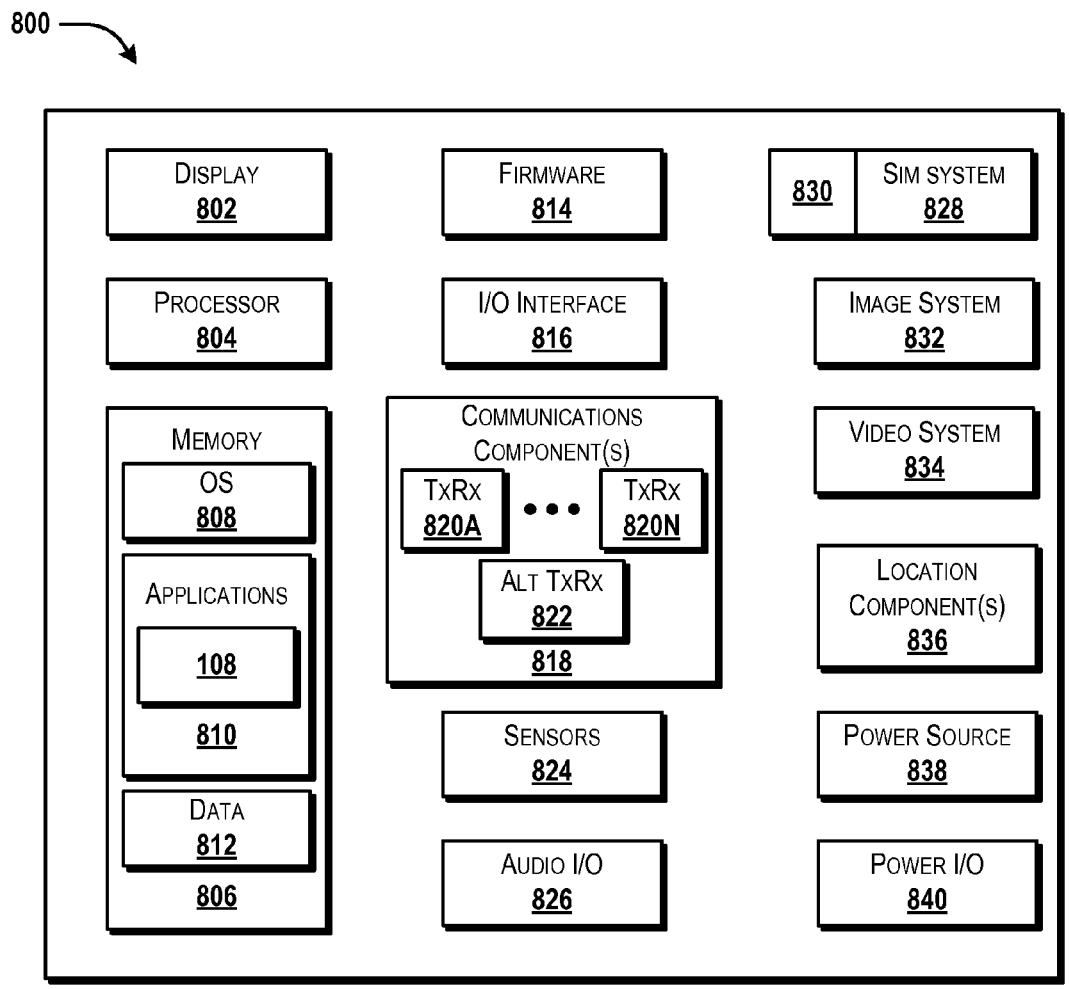
FIG. 8 is a block diagram illustrating an example mobile device configured to provide functionality for controlling data access and rate in a network, according to some illustrative embodiments.

Turning now to FIG. 8, an illustrative mobile device 800 and components thereof will be described. In some embodiments, the user device 102 described above with reference to FIGS. 1-7 can be configured as and/or can have an architecture similar or identical to the mobile device 800 described herein in FIG. 8. It should be understood, however, that the user device 102 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display asset information, asset tag or asset ID information, asset management account information, various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the traffic control application 108, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the MS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, scanning or capturing asset ID or asset tag information, creating new asset tags or asset ID numbers, viewing asset information and/or account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, subscriber information, subscription plans, credit balances, usage rates $r_u$, flow rates $r_f$, allocation rates $r_a$, and/or other applications or program modules.

According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, asset information, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for controlling data access and rate in a network have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   detecting, at a server computer that executes an enforcement application, a data session request, the data session request comprising a request for a data session between a data source and a user device;
   obtaining, at the server computer, network data that indicates network congestion at a portion of a network between the data source and the user device;
   obtaining, at the server computer, a credit subscription plan that is associated with the user device, the credit subscription plan that specifies an allocation rate at which credits are added to a credit account associated with the user device;
   determining, at the server computer, credit usage rates, wherein each of the credit usage rates defines a rate at which credits will be withdrawn from a credit pool during the data session, wherein the credit usage rates are based on the network congestion as indicated by the network data that indicates the network congestion, and wherein the credit usage rates are further based on a quality of service level;
   generating, at the server computer, credit usage rate options for the data session, wherein the credit usage rate options are based on the credit usage rates determined;
   transmitting, by the server computer, the credit usage rate options to the user device for presentation in a user interface at the user device;
   obtaining, by the server computer, a selection of a credit usage rate option of the credit usage rate options, the selection being obtained from the user device, wherein the selection is made via the user interface;
   determining, at the server computer, a plurality of flow rates that define a rate at which the credits flow from the credit account to the credit pool, wherein the plurality of flow rates comprises
      a first flow rate at which the credits flow during the data session,
      a second flow rate at which the credits flow when the user device is not involved in the data session, and
      a third flow rate at which the credits flow during the data session if the data session does not involve congested network resources;
   adjusting, by the server computer, a maximum capacity of the credit pool, wherein the maximum capacity is based on the network congestion;
   in response to a determination that the data session does not involve congested network resources, adding, by the server computer, credits to the credit pool at the third flow rate during the data session; and
   removing, by the server computer, a credit from the credit pool at a credit usage rate during the data session, wherein the credit usage rate corresponds to the credit usage rate option selected.

2. The method of claim 1, wherein the credit usage rate is determined based on subscriber data obtained from the user device.

3. The method of claim 2, wherein the subscriber data comprises subscriber information and the credit subscription plan.

4. The method of claim 3, wherein the subscriber data comprises information obtained from charging and billing systems and is based upon traffic management data obtained from the user device.

5. The method of claim 4, wherein the charging and billing systems generate options data that comprises the credit usage rate options, and wherein the options data is used by the user device to generate the user interface.

6. The method of claim 1, wherein removing the credit from the credit pool comprises:
   determining a time associated with the credit usage rate;
   initiating a timer set to the time;
   determining that the time has passed; and
   removing the credit from the credit pool.

7. The method of claim 6, further comprising:
   determining that another credit should be removed from the credit pool;
   determining that additional credits are not available in the credit pool; and
   in response to determining that the additional credits are not available, issuing a command to terminate the data session.

8. The method of claim 6, further comprising:
   determining if additional credits are available in the credit pool; and
   in response to a determination that the additional credits are not available in the credit pool, issuing a command to generate a prompt at the user device, the prompt comprising one of a first option to purchase the additional credits to prevent termination of the data session and a second option to increase the third flow rate to prevent the termination.

9. A computer storage medium having computer-executable instructions stored thereon that, when executed by a processor, cause the processor to perform operations comprising:
   detecting a data session request, the data session request comprising a request for a data session between a data source and a user device;
   obtaining network data that indicates network congestion at a portion of a network between the data source and the user device;
   obtaining a credit subscription plan that is associated with the user device, the credit subscription plan that specifies an allocation rate at which credits are added to a credit account associated with the user device;
   determining credit usage rates, wherein each of the credit usage rates defines a rate at which credits will be withdrawn from a credit pool during the data session, wherein the credit usage rates are based on the network congestion as indicated by the network data that indicates the network congestion, and wherein the credit usage rates are further based on a quality of service level;

generating credit usage rate options for the data session, wherein the credit usage rate options are based on the credit usage rates determined;

transmitting the credit usage rate options to the user device for presentation in a user interface at the user device;

obtaining a selection of a credit usage rate option of the credit usage rate options, the selection being obtained from the user device, wherein the selection is made via the user interface;

determining a plurality of flow rates that define a rate at which the credits flow from the credit account to the credit pool, wherein the plurality of flow rates comprises a first flow rate at which the credits flow during the data session, a second flow rate at which the credits flow when the user device is not involved in the data session, and a third flow rate at which the credits flow during the data session if the data session does not involve congested network resources;

adjusting a maximum capacity of the credit pool, wherein the maximum capacity is based on the network congestion;

in response to a determination that the data session does not involve congested network resources, adding credits to the credit pool at the third flow rate during the data session; and removing a credit from the credit pool at a credit usage rate during the data session, wherein the credit usage rate corresponds to the credit usage rate option selected.

10. The computer storage medium of claim 9, wherein the computer-executable instructions are executed by the processor to perform operations further comprising:

obtaining subscriber data comprising subscriber information and the credit subscription plan; and determining, based upon the subscriber data, the credit usage rate.

11. The computer storage medium of claim 9, wherein the computer-executable instructions are executed by the processor to perform operations further comprising:

determining a time associated with the credit usage rate;

initiating a timer set to the time;

determining that the time has passed; and removing the credit from the credit pool.

12. The computer storage medium of claim 11, wherein the computer-executable instructions are executed by the processor to perform operations further comprising:

determining that another credit should be removed from the credit pool;

determining that additional credits are not available in the credit pool; and in response to determining that the additional credits are not available, issuing a command to terminate the data session.

13. A system comprising:

a processor; and a memory that stores computer-executable instructions that are executed by the processor to perform operations comprising:

detecting a data session request, the data session request comprising a request for a data session between a data source and a user device;

obtaining network data that indicates network congestion at a portion of a network between the data source and the user device;

obtaining a credit subscription plan that is associated with the user device, the credit subscription plan that specifies an allocation rate at which credits are added to a credit account associated with the user device;

determining credit usage rates, wherein each of the credit usage rates defines a rate at which credits will be withdrawn from a credit pool during the data session, wherein the credit usage rates are based on the network congestion as indicated by the network data that indicates the network congestion, and wherein the credit usage rates are further based on a quality of service level;

generating credit usage rate options for the data session, wherein the credit usage rate options are based on the credit usage rates determined;

transmitting the credit usage rate options to the user device for presentation in a user interface at the user device;

obtaining a selection of a credit usage rate option of the credit usage rate options, the selection being obtained from the user device, wherein the selection is made via the user interface;

determining a plurality of flow rates that define a rate at which the credits flow from the credit account to the credit pool, wherein the plurality of flow rates comprises a first flow rate at which the credits flow during the data session, a second flow rate at which the credits flow when the user device is not involved in the data session, and a third flow rate at which the credits flow during the data session if the data session does not involve congested network resources;

adjusting a maximum capacity of the credit pool, wherein the maximum capacity is based on the network congestion;

in response to a determination that the data session does not involve congested network resources, adding credits to the credit pool at the third flow rate during the data session; and removing a credit from the credit pool at a credit usage rate during the data session, wherein the credit usage rate corresponds to the credit usage rate option selected.

14. The system of claim 13, wherein the computer-executable instructions are executed by the processor to perform operations further comprising:

obtaining subscriber data comprising subscriber information and the credit subscription plan; and determining, based upon the subscriber data, the credit usage rate.

15. The system of claim 13, wherein the computer-executable instructions are executed by the processor to perform operations further comprising:

determining a time associated with the credit usage rate;

initiating a timer set to the time;

determining that the time has passed; and removing the credit from the credit pool.

16. The system of claim 15, wherein the computer-executable instructions are executed by the processor to perform operations further comprising:

determining that another credit should be removed from the credit pool;

determining that additional credits are not available in the credit pool; and in response to determining that the additional credits are not available, issuing a command to terminate the data session.

* * * * *